Patented Oct. 23, 1951

2,572,571

UNITED STATES PATENT OFFICE 2,572,571

STABILIZED VINYL CHLORIDE RESINS

Paul E. Marling, Dayton, Ohio, assignor to Monsanto Chemical Company, St. Louis, Mo., a corporation of Delaware No Drawing. Application July 29, 1948,
Serial No. 41,417

6 Claims. (Cl. 260—45.7)

This invention relates to a method of stabilizing vinyl chloride resins against discoloration upon exposure to elevated temperatures. More particularly it relates to improved polyvinyl chloride and vinyl chloride copolymers which are unusually resistant to discoloration by heat.

Polyvinyl chloride and copolymers of substantial portions of vinyl chloride and minor proportions of other mono-olefinic compounds frequently become discolored when subjected to temperatures usually used in processing operations. Although many stabilizing agents have been proposed few of them are effective over wide ranges of operating conditions.

The purpose of this invention is to provide a new and useful class of stabilizing agents which are readily available at low cost. A further purpose of this invention is to provide new vinyl chloride polymers which are stable to discoloration at temperatures usually used in mixing and extruding operations. A still further purpose of this invention is to provide new superior vinyl chloride resins.

It has been found that aromatic esters of phosphorus acid are unusually effective in preventing the development of discoloration in transparent or colorless vinyl chloride polymers. Suitable esters are the aromatic phosphite having the structure:

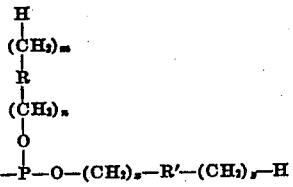

$$H-(CH_2)_x-R''-(CH_2)_y-O-P-O-(CH_2)_o-R'-(CH_2)_p-H$$

wherein R, R' and R'' are arylene radicals, and and $m$, $n$, $x$, $y$, $o$, and $p$ are small whole numbers from zero (0) to two (2), inclusive, such as triphenyl phosphite, tricresyl phosphite, trinaphthyl phosphite and other triaryl phosphites. Other useful aryl phosphites are the mixed esters, for example, diphenylcresyl phosphite, dibenzylcresyl phosphite and diphenylbenzyl phosphite. The stabilizing agents are effective in a wide range of proportions, for example from 0.1 percent by weight to 20 percent, although the most effective compositions are prepared by using from 0.5 to 10 percent.

The vinyl chloride resins useful in the practice of this invention are polyvinyl chloride and copolymers of at least 70 percent of vinyl chloride and up to 30 percent of other polymerizable mono-olefinic monomers compatible with vinyl chloride, for example vinyl acetate and other vinyl esters of monocarboxylic acids, particularly those having from 1 to 5 carbon atoms, ethyl maleate, ethyl fumarate and other alkyl esters of maleic and fumaric acid, especially those wherein the alkyl radical is one of four carbon atoms, methyl methacrylate, and other alkyl esters of acrylic and methacrylic acids, particularly those wherein the alkyl radical has one to four carbon atoms, and vinylidene chloride. These polymers and copolymers may be prepared by any of the well known methods, but polymerization in aqueous emulsion is generally the most effective method.

The method of stabilizing the vinyl chloride polymers involves merely the incorporation of the triaryl phosphite by any mixing expedient. It is usually conventional to compound the vinyl resins on a roll mill, heated if necessary, or a Banbury type mixer. The resins may be compounded with or without plasticizers, depending upon the ultimate use of the resin. If no plasticizer is to be used the stabilizer may be added by mixing it with an emulsion of the resin in water, however, in most cases it will be found desirable to use plasticizers, because the uniform distribution of the stabilizing agent by milling and the ultimate fabrication of the polymer are thereby facilitated. Suitable plasticizers for vinyl resins are dioctyl phthalate, tricresyl phosphate, dibutylsebacate, the N-dialkyl amides in fatty acids, polyesters, complex phosphates and the aliphatic dihydric alcohols modified by interreaction with monobasic fatty acids.

Further details of the practice of this invention are set forth with respect to the following examples.

Example 1

A copolymer of 85 percent by weight of vinyl chloride and 15 percent of vinyl acetate was softened by mixing with two parts by weight of acetone. After mixing to a homogeneous plastic mass part of the composition was mixed with one percent of triphenyl phosphite. The plastic not containing the triphenyl phosphite was used as a control. The test sample and the control were subjected to 160° C. for 5 minutes. The control sample was seriously discolored, whereas, the stabilized sample containing triphenyl phosphite was unaffected.

Example 2

A composition made by intimately mixing 20 parts by weight of polyvinyl chloride and 13 parts by weight of dioctyl-phthalate was blended with two percent of triphenyl phosphite, and tested in the manner described in the preceding example. The unstabilized composition was seriously discolored, whereas, the composition containing triphenyl phosphite was virtually unchanged.

The invention is defined by the following claims:

1. A vinyl chloride resin stabilized against discoloration upon heating which comprises a copolymer in which at least 70 percent of the monomeric component is vinyl chloride, said polymer containing intimately dispersed therein from 0.1 to 20 percent of an aromatic phosphite having the structure:

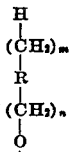

H—(CH$_2$)$_o$—R''—(CH$_2$)$_p$—O—P—O—(CH$_2$)$_x$—R'—(CH$_2$)$_y$—H wherein R, R' and R'' are arylene radicals, and m, n, x, y, o and p are small whole numbers from zero (0) to two (2), inclusive.

2. A vinyl chloride resin stabilized against discoloration upon heating which comprises polyvinyl chloride having intimately dispersed therein from 0.1 to 20 percent of an aromatic phosphite having the structure:

H—(CH$_2$)$_o$—R''—(CH$_2$)$_p$—O—P—O—(CH$_2$)$_x$—R'—(CH$_2$)$_y$—H wherein R, R' and R'' are arylene radicals, and and m, n, x, y, o, and p are small whole numbers from zero (0) to two (2), inclusive.

3. A vinyl chloride resin stabilized against discoloration upon heating which comprises a copolymer of at least 70 percent vinyl chloride and up to 30 percent of a monomeric substance of the group consisting of vinyl esters of carboxylic acids, alkyl acrylates, alkyl methacrylates, alkyl fumarates, alkyl maleates, and vinylidene chloride, said resin containing intimately dispersed therein from 0.1 to 20 percent of an aromatic phosphite having the structure:

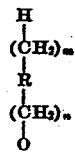

H—(CH$_2$)$_o$—R''—(CH$_2$)$_p$—O—P—O—(CH$_2$)$_x$—R'—(CH$_2$)$_y$—H wherein R, R' and R'' are arylene radicals, and and m, n, x, y, o, and p are small whole numbers from zero (0) to two (2), inclusive.

4. A vinyl chloride resin stabilized against discoloration upon heating which comprises a copolymer in which at least 70 percent of the monomeric components is vinyl chloride, said polymer containing intimately dispersed therein from 0.1 to 20 percent of triphenyl phosphite.

5. A vinyl chloride resin stabilized against discoloration upon heating which comprises polyvinyl chloride having intimately dispersed therein from 0.1 to 20 percent of triphenyl phosphite.

6. A vinyl chloride resin stabilized against discoloration upon heating which comprises a copolymer of at least 70 percent vinyl chloride and up to 30 percent of a monomeric substance of the group consisting of vinyl esters of carboxylic acids, alkyl acrylates, alkyl methacrylates, alkyl fumarates, alkyl maleates and vinylidene chloride, said resin containing intimately dispersed therein from 0.1 to 20 percent of triphenyl phosphite.

PAUL E. MARLING.

REFERENCES CITED

The following references are of record in the file of this patent:

UNITED STATES PATENTS

| Number | Name | Date |
|---|---|---|
| 1,976,359 | Murray | Oct. 9, 1934 |
| 2,419,354 | Howland | Apr. 22, 1947 |
| 2,456,216 | Richter | Dec. 14, 1948 |